Figure 1:
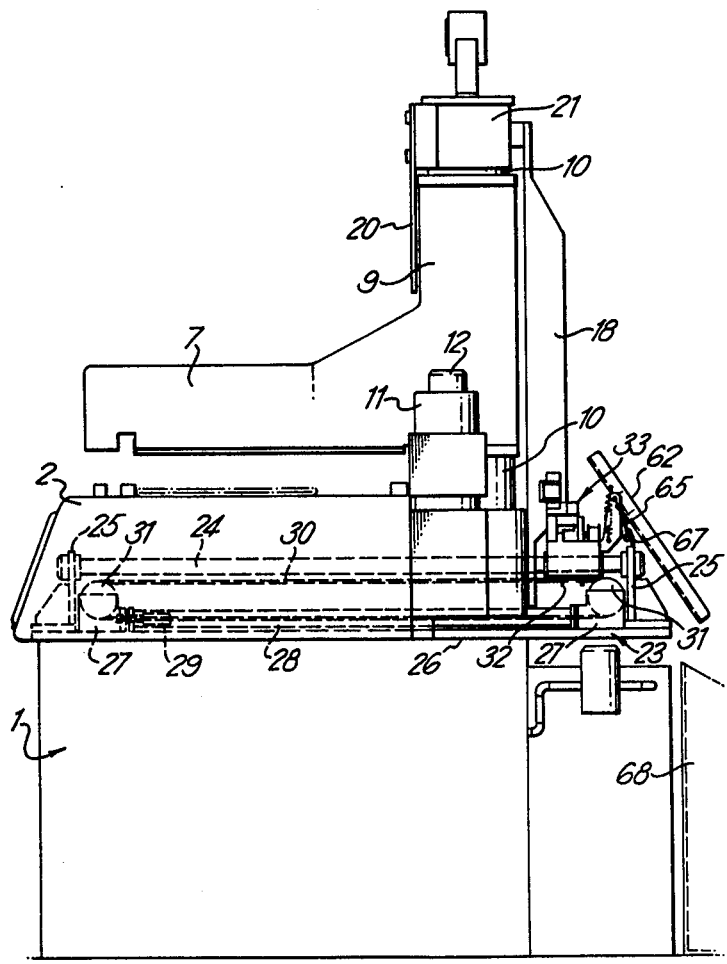

United States Patent [19]
Page

[11] 4,101,368
[45] Jul. 18, 1978

[54] INNER TUBE SPLICING MACHINES

[75] Inventor: Roy Arthur Page, Wolverhampton, England

[73] Assignee: The Midland Designing & Manufacturing Co. Ltd., Wolverhampton, England

[21] Appl. No.: 750,582

[22] Filed: Dec. 15, 1976

[30] Foreign Application Priority Data

Jan. 8, 1976 [GB] United Kingdom ............... 630/76

[51] Int. Cl.² .................. B29H 15/04; G03D 15/04
[52] U.S. Cl. ............................... 156/503; 83/150;
 83/157; 83/368; 83/455; 83/614; 156/122;
 156/159
[58] Field of Search ............. 156/122, 157–159,
 156/250, 256, 258, 263, 304, 502, 503, 510, 511,
 517, 519, 521, 267; 83/54, 150, 157, 171, 368,
 455, 614

[56] References Cited
U.S. PATENT DOCUMENTS

| 2,273,464 | 2/1942 | Campbell et al. | 156/122 |
| 2,549,560 | 4/1951 | Archer | 83/157 |
| 2,660,216 | 11/1953 | Clayton et al. | 156/503 |
| 2,752,983 | 7/1956 | George | 156/503 |
| 2,759,402 | 8/1956 | Jedlick | 83/157 |
| 2,773,541 | 12/1956 | Mulbarger et al. | 156/122 |
| 3,619,330 | 11/1971 | Kerr | 156/503 |
| 3,653,293 | 4/1972 | Wallis | 83/157 |

Primary Examiner—William A. Powell
Assistant Examiner—John E. Kittle
Attorney, Agent, or Firm—Melville, Strasser, Foster & Hoffman

[57] ABSTRACT

In, or for use in, a vehicle inner tube splicing machine, a tube end cutting assembly comprising a cutting knife supporting carriage which is mounted on a pair of spaced parallel guide shafts and is reciprocated by hydraulically powered means. The knife supporting carriage also has mounted thereon scrap removal means which co-acts with cutting knives to remove off-cuts from said tube ends.

10 Claims, 8 Drawing Figures

Fig. 3.

Fig. 4.

INNER TUBE SPLICING MACHINES

This invention relates to vehicle inner tube splicing machines and is concerned particularly with an improved cutting assembly for such machines.

Tube splicing machines with which the invention is concerned are of the kind, hereinafter referred to as of the kind described, which comprise a pair of spaced apart tube end supporting tables each having in operative association therewith a tube end clamping arm and being movable towards one another to effect splicing of the tube ends, support means positioned above the supporting tables to support the bulk of the tube to be spliced, and a knife supporting and cutting assembly arranged to be reciprocated relative to the supporting tables and their co-acting clamping arms to cut the tube ends prior to the splicing operation.

It is among the objects of the present invention to provide, for a splicing machine of the kind hereinbefore described, a cutting assembly of improved construction and operation.

According to the present invention, there is provided in, or for use in, an inner tube splicing machine of the kind hereinbefore described, a cutting assembly comprising a knife supporting carriage mounted on a pair of parallel guide shafts, and hydraulically powered means for causing reciprocation of the carriage relative to the tube end supporting tables and the co-acting clamping arms of the machine.

Preferably, the hydraulically powered means comprise a cylinder positioned below the carriage guide shafts, a double-acting piston arranged for reciprocal movement within the cylinder, and a cable attached to opposite ends of the piston and to an anchorage point on the carriage.

According to a further aspect of the present invention, the knife supporting carriage includes scrap removing means for the off-cut ends of the tube, said means comprising a chute positioned to the rear of the cutting elements to receive said off-cut ends, the chute being tiltable, on retraction of the carriage, to eject the off-cut ends.

Figure 2:
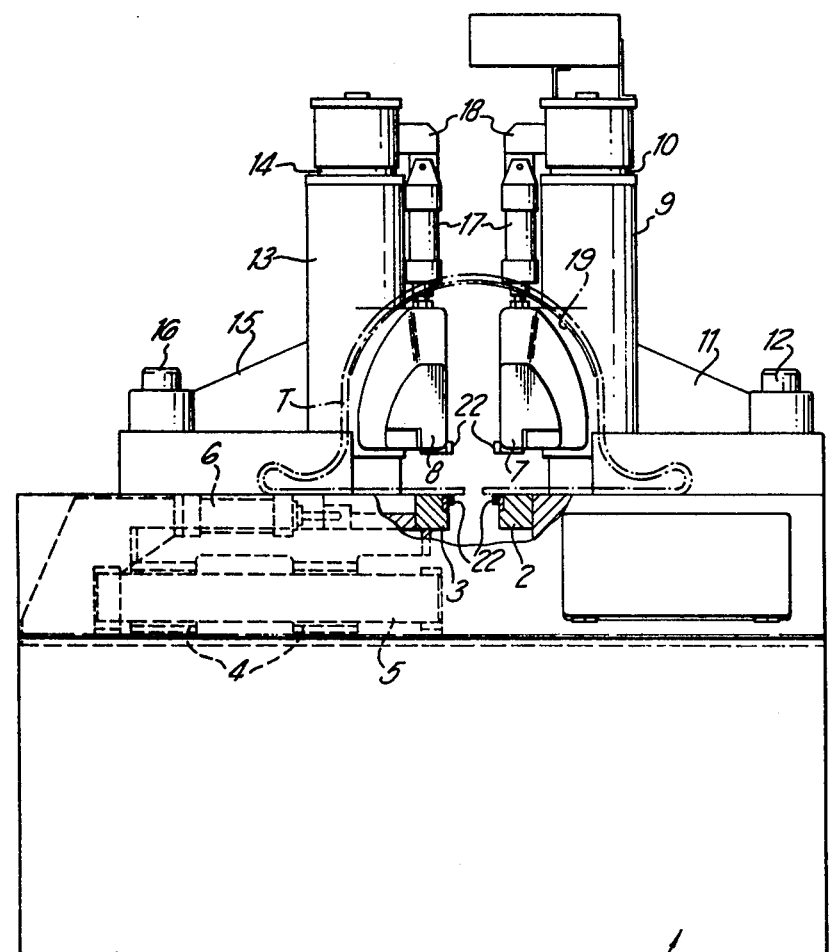
Figures 3, 4:
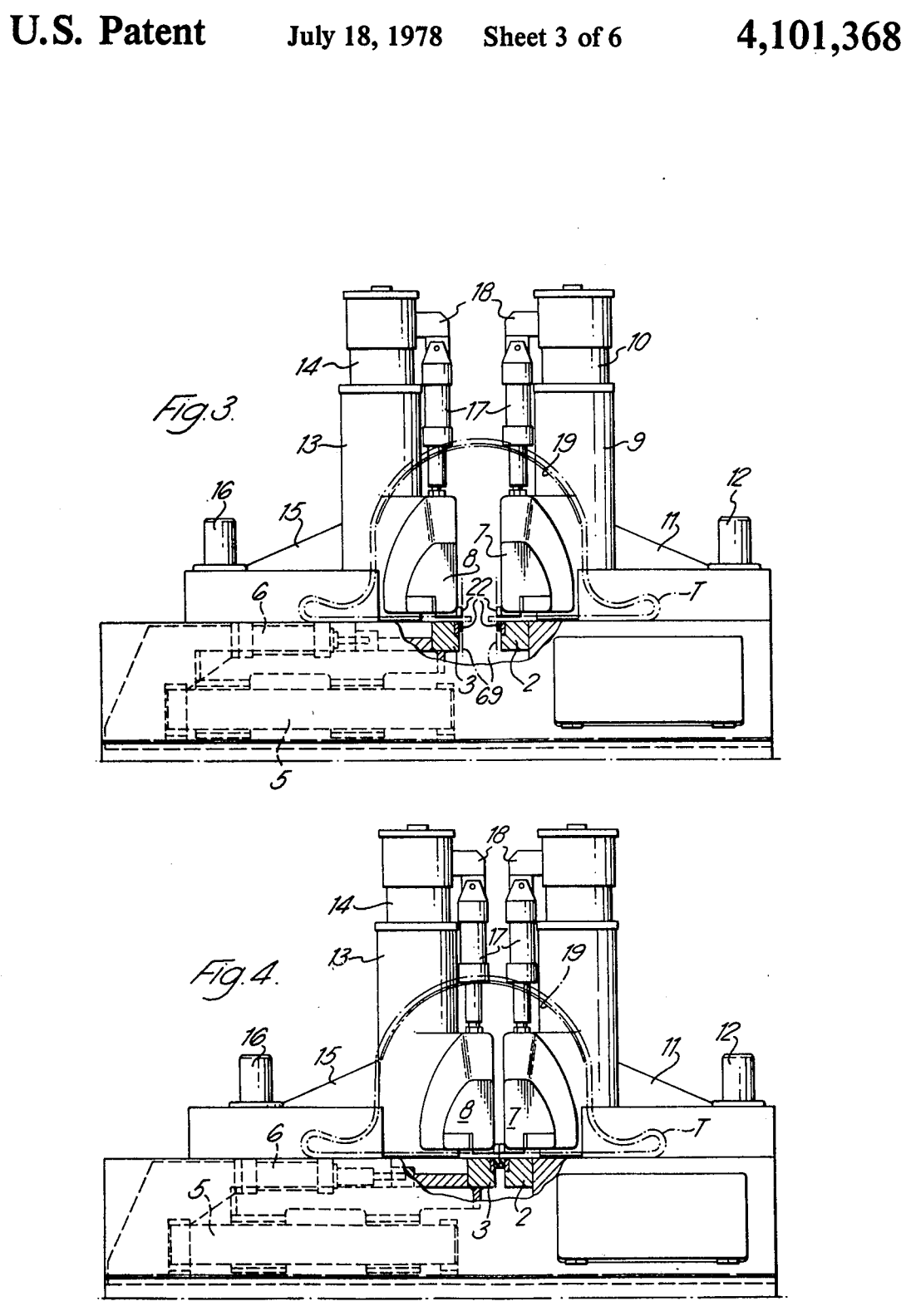
Figure 5:
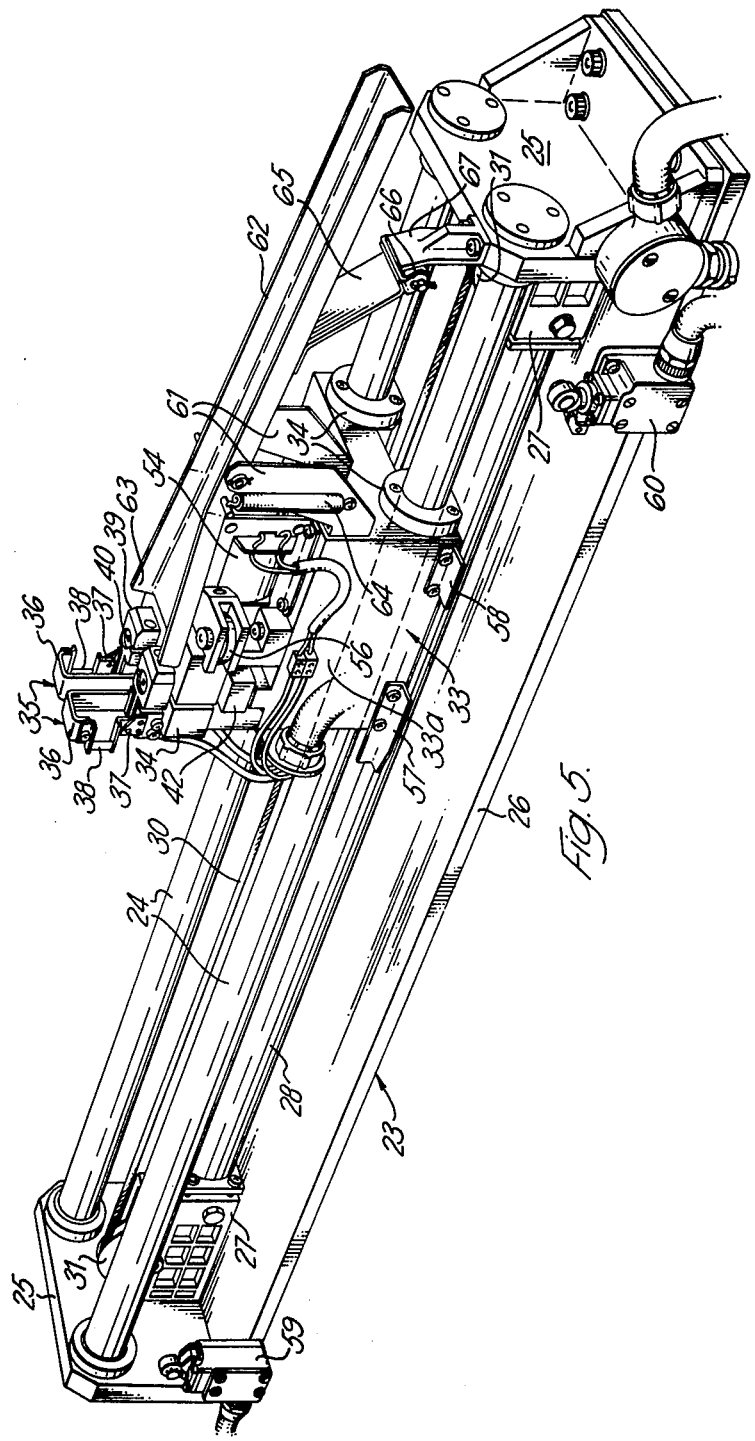
Figure 6:
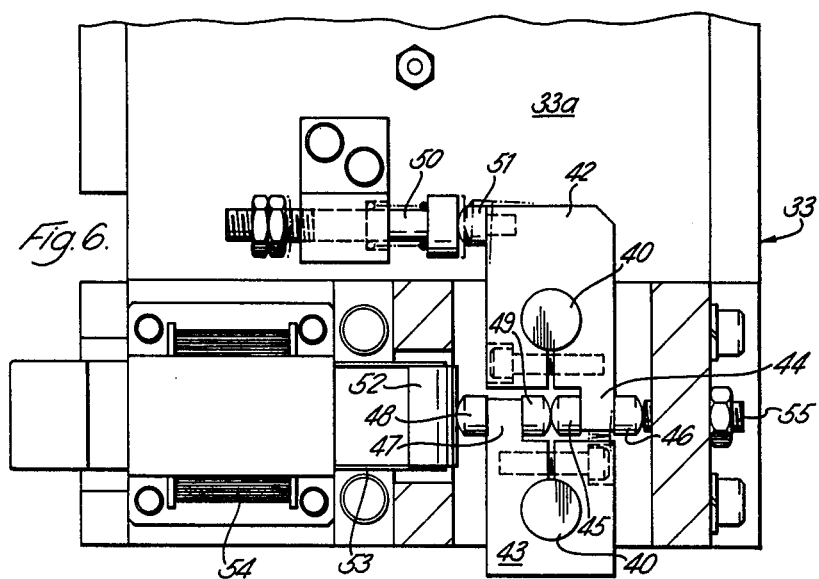
Figure 7:
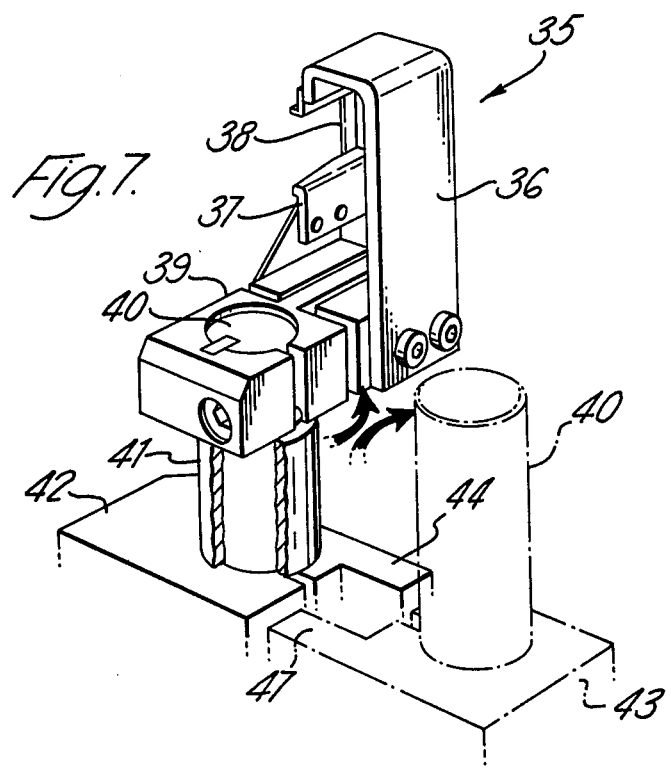
Figure 8:
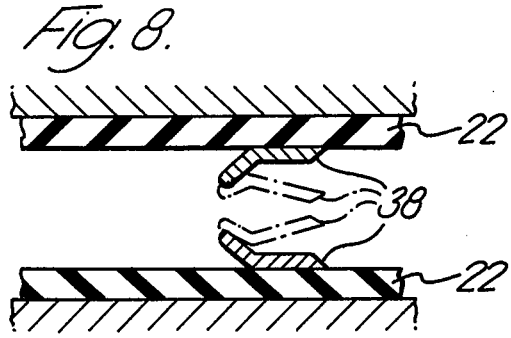

The invention is illustrated by way of example in the accompanying drawings in which, FIG. 1 is a side elevation of an inner tube splicing machine incorporating a tube end cutting assembly according to the invention, FIG. 2 is a front elevation corresponding to FIG. 1 with the cutting assembly removed for clarity, FIG. 3 is an elevation corresponding to part of FIG. 2 and showing parts of the machine in a second position, FIG. 4 is an elevation corresponding to FIG. 3 showing said parts in a third position, FIG. 5 is a perspective view, on an enlarged scale, of the tube end cutting assembly, FIG. 6 is a plan view, on an enlarged scale, of the cutting device operating mechanism, FIG. 7 is a perspective view showing the mounting of one cutting device, and FIG. 8 is a scrap view showing the relative positions of the two cutting knives.

Referring to the drawings, there is shown an inner tube splicing machine which comprises a support frame or base structure 1 on which are mounted two tube-end supporting tables 2 and 3, the table 2 being fixed relative to the base 1 and the table 3 being movable relative to the base structure 1, and to the table 2, in a horizontal plane. For the latter purpose, the movable table 3 is mounted, via bearings 4, on fixed guide members 5 and is movable under the action of a double-acting hydraulic ram 6 towards and away from the table 2.

Arranged above the tables 2 and 3 to co-act therewith are a pair of clamping arms 7 and 8, the clamping arm 7 being slidably mounted, via a sleeve 9, on a vertical column 10 provided on the fixed supporting table 2. The sleeve 9 is formed with a projecting flange 11 which is slidably engageable with a vertical guide rod 12 fixed to the table 2 to prevent turning of the arm 7. The clamping arm 8 is similarly slidably mounted, via a sleeve 13, on a vertical column 14 positioned on the movable table 3. The sleeve 13 is also provided with a projecting flange 15 which is slidably engageable with a vertical guide rod 16 fixed to the movable table 3 to prevent turning of the arm 8.

Vertical movement of the clamping arms 7 and 8 is effected by double-acting hydraulic rams 17 which extend respectively between the arm 7 and a bracket 18 and between the arm 8 and a second bracket 18.

Positioned over the arms 7 and 8 is a support cage which is indicated at 19 and is of known construction which, in use, serves to support the bulk of the inner tube to be spliced. The cage 19 is fixed, in known manner, to a bracket 20 (FIG. 1) attached to a cap element 21 of the column 10. In this way, it will be seen that the cage 19 is not affected by the movement of the support arms 7 and 8.

The adjacent inner edge faces of the tables 2 and 3 and of the support arms 7 and 8 are each provided with a facing or butting element 22 which is preferably of rubber.

The machine hereinbefore is of known construction, it being understood that only the main parts of the machine sufficient to provide an understanding of the invention have been described.

In accordance with the invention, there is provided a tube end cutting assembly 23 which, as shown particularly in FIG. 5, comprises a pair of spaced parallel shafts 24 fixedly secured in end brackets 25 which are attached to a base plate 26 supported on, or supportable on, the base structure 1, Also attached to the base plate 26, via pulley brackets 27, is an hydraulic cylinder 28 having a double acting position 29 (FIG. 1) mounted therein for reciprocal movement. Opposite ends of a wire cable 30 are passed over pulleys 31 mounted in the brackets 27 and are secured to opposite ends of the piston 29. At a mid position, the cable 30 is fixed to an anchorage bracket 32 (FIG. 1) which is attached to a knife supporting carriage 33. The carriage 33 is mounted, via bearings 34, for sliding movement on the shafts 24.

The carriage 33 includes a knife table 33a on which is supported a bearing block 34 which in turn supports, for angular turning movement, a pair of cutting devices 35. The cutting devices 35 each comprise knife holders 36 and 37 between which is positioned a blade 38 which is of angular formation in cross section (see FIG. 8) to co-act accurately with the co-acting facing or butting elements 22 of the support tables 2 and 3 and the clamping arms 7 and 8, which elements are preferably of rubber or the like. The cutting devices 35 are each attached to a bracket 39 which is keyed and clamped to one end of a vertical spindle 40 which is mounted for angular turning movement in a bearing sleeve 41 held in the bearing block 34. The other ends of the spindles 40 have keyed and/or clamped thereto, respectively, actuator blocks 42 and 43. The block 42 has a projection 44 having oppositely disposed dome-headed contact elements 45 and 46, and the block 43 has a corresponding projection 47 having oppositely disposed dome-headed contact elements 48 and 49. Under the action of a spring-loaded plunger 50 acting on a dome-headed contact element 51 provided on the block 42, the contact elements 45 and 49 are urged into engagement with each other and the element 48 is urged into contact with an arcuate element 52 of the actuating arm 53 of an electrically operated solenoid 54. The solenoid 54, which in FIG. 6 is shown in its extended or operative position where it is holding the blades 38 in their operative positions as will hereinafter be described, is movable into an inoperative position where the actuating arm 53 is retracted and, under the action of the spring-loaded plunger 50, the blocks 42, 43 will be angularly turned in opposite directions, as indicated in chain dot lines, to move the blades 38 into their inoperative positions. The contact element 46 serves to engage an adjustable stop screw 55 which limits the extent of angular turning movement of the blocks 42, 43 into the operative positions of the blades.

The knife table 33a of the carriage 33 also supports a pair of horizontal guide rollers, one of which is shown at 56, which are positioned to engage guide surfaces provided on the machine to effect acurate movement of the carriage during a cutting operation.

Front and rear cam plates 57 and 58 are provided on the carriage 33 to co-act respectively with limit switches 59 and 60 provided on the base plate 26 to control the stroke of the piston 29 of the cylinder 28.

Mounted on the rear end of the carriage 33 are a pair of spaced brackets 61 which hingedly support a chute 62. The forward end 63 of the chute 62 is immediately to the rear of the cutting devices 35 so that, in use, the off-cuts from the tube ends fall onto the chute. In this respect, the end 63 of the chute is biassed into the position shown in FIG. 5 by means of tension springs 64. Provided on the underside of the chute 62 is a depending tilting arm 65 supporting a roller 66 which is positioned to contact a guide plate 67 attached to one of the end brackets 25. Thus, in use, after a cutting operation when the off-cuts are deposited on the front end 63 of the chute, the carriage 33 is retracted and, during this operation, the roller 66 enters into engagement with the plate 67 and causes the chute to tilt into the position shown in FIG. 1 and to eject the off-cuts into a suitable bin 68. On forward movement into the operative position of the carriage 33, the chute 62 returns to its normal position under the action of the springs 64.

In use, in order to cut and splice an inner tube, a length of uncured tube T is draped over the support cage 19 and the ends thereof are positioned respectively on the tables 2 and 3 as shown in FIG. 2. The clamping arms 7 and 8 are then moved downwardly under the action of the rams 17 into engagement with the respective tube ends to clamp them in position as is shown in FIG. 3.

The hydraulic ram 28, 29 is then operated to move the carriage 33 into its forward operative position to cause the blades 38, which are heated in known manner, to shear through the tube ends. In this respect, the blades 38 are moved into their operative positions by the solenoid 54 and are in direct alignment with the rubber faces 22 of the tables 2 and 3 and the clamping arms 7 and 8 as indicated by the chain dot lines 69 in FIG. 3. Furthermore, the ram 28, 29 is controlled, by solenoid actuated flow regulators and proximity switches, to effect fast approach and creep entry and exit speeds. In the latter respect, the speed of travel of the carriage 33, and thus of the blades 38, is reduced towards the end of the cutting operation in order to minimise local distortion of the material.

On completion of the cutting operation, the solenoid 54 is de-actuated to allow the blades 38 to move inwardly towards each other into their inoperative positions as shown in chain dot lines in FIG. 8 and the carriage 33 is retracted. It will be appreciated that the inward movement of the blades 38 ensures that they do not contact, and thus damage, the freshly cut tube ends during their return stroke.

During the aforementioned operations, the chute 62 will operate in the manner hereinbefore described to remove the off-cut tube ends.

Thereafter, the movable table 3, together with the clamping arm 8 which is supported thereon, will be moved, under the action of the ram 6, towards the stationary table 2 to force the tube ends into engagement with each other and thereby cold-weld them together. After a pre-determined period of time, the clamping arms 7, 8 are raised by the rams 17 and the spliced tube is then removed manually and subjected to a curing operation.

Preferably, the cutting and splicing assembly 33 is provided as a self-contained unit thereby enabling existing units to be removed for replacement or repair.

It will be appreciated that the machine according to the invention is fully automatic and the form of drive used makes it smooth-running compared with known drives.

I claim:

1. An inner tube splicing machine having a pair of spaced apart tube end supporting tables, each of said tables having in operative association therewith a tube end clamping arm, one of said tables and its coacting arm being movable towards the other of said tables and its coacting arm to effect splicing of the tube ends, support means positioned above said supporting tables to support the bulk of said tube to be spliced, a cutting assembly arranged to be reciprocated relative to said supporting tables and their said coacting clamping arms to cut said tube ends prior to said splicing operation, said tube end cutting assembly being mounted on a pair of horizontally disposed spaced parallel guide shafts, and hydraulically powered piston/cylinder means operatively connected to said cutting assembly to cause reciprocal movement of said cutting assembly on said guide shafts relative to said tube end supporting tables and said coacting clamping arms of the machine to effect a cutting operation, said tube end cutting assembly comprising a supporting carriage having a knife table slidably mounted on said guide shafts, a bearing block supported on said knife table, first and second vertically disposed spindles turnably mounted in said bearing block, a cutting device secured to one end of each of said first and second spindles, each of said cutting device having a pair of spaced knife holders and a cutting blade extending therebetween, an actuator block fixed to the other end of each of said first and second spindles, and an electrically operated solenoid the actuator arm of which solenoid is arranged to impart angular turning movement to said actuator blocks which in turn impart angular turning movement to said cutting devices to move said cutting devices between cutting and non-cutting positions.

2. A splicing machine as claimed in claim 1, wherein the piston of said piston/cylinder means is double-acting and said tube end cutting assembly is operatively connected to opposite ends of said piston by means of a cable passing over pulleys positioned at opposite ends of said guide shafts.

3. An assembly as claimed in claim 1, in which each of said blades is of angular formation in cross section to present a cutting edge portion which, in the cutting position, lies directly adjacent to said tube end supporting tables and said coacting clamping arms.

4. An assembly as claimed in claim 1, in which said actuator blocks of said cutting devices are formed with co-acting projections whereby said actuating arm of said solenoid operates on both of said blocks simultaneously and causes angular turning movement of said cutting devices in opposite directions.

5. An assembly as claimed in claim 1, in which said supporting carriage is provided with oppositely directed guide rollers which, in use, are in engagement with guide means provided on the machine.

6. An assembly as claimed in claim 1, in which said supporting carriage includes scrap removing means which collect and eject the cut-off ends of said inner tube.

7. An assembly as claimed in claim 6, in which said scrap removing means comprise an elongated chute hingedly mounted on brackets secured to said knife table to the rear of said cutting devices.

8. An assembly as claimed in claim 7, including means for biasing said chute into a first position where it can receive said cut-off ends, and means for moving said chute into a second position, against said bias, to eject said cut-off ends.

9. An assembly as claimed in claim 8, in which said means for biasing said chute into said first position comprise tension springs.

10. An assembly as claimed in claim 8, in which said means for moving said chute into said second position comprise a tilting arm which, during movement of said supporting carriage to a retracted position, is provided to engage a guide plate fixed to a part of said assembly.

* * * * *